United States Patent [19]

Ida et al.

[11] Patent Number: 5,248,260

[45] Date of Patent: Sep. 28, 1993

[54] CABLE REEL

[75] Inventors: Yuichi Ida; Nobuo Matsuzaki, both of Miyagi, Japan

[73] Assignee: Alps Electric Co., Ltd., Tokyo, Japan

[21] Appl. No.: 841,925

[22] Filed: Feb. 25, 1992

[30] Foreign Application Priority Data

Feb. 26, 1991 [JP] Japan .................................. 3-15785[U]

[51] Int. Cl.⁵ .............................................. H01R 35/04
[52] U.S. Cl. ............................................ 439/15; 439/164
[58] Field of Search ................ 439/15, 164; 242/54 R

[56]          References Cited
         U.S. PATENT DOCUMENTS

| 4,674,352 | 6/1987 | Mizuno et al. | 439/15 |
| 4,722,690 | 2/1988 | Priede | 439/15 |
| 4,735,573 | 4/1988 | Zeller et al. | 439/15 |
| 4,789,342 | 12/1988 | Shitanoki | 439/15 |

Primary Examiner—Gary F. Paumen
Attorney, Agent, or Firm—Guy W. Shoup; David W. Heid

[57] ABSTRACT

A lock for preventing free rotation of the movable member of a cable real relative to the stationary member includes a screw supported on a lock member in such a manner as to be screwable into either the movable member or the stationary member, and a stopper integrally formed on the lock member for preventing disengagement of the screw. The movable member can be securely locked with respect to the stationary member, and can be released from its locked position with good operational efficiency.

8 Claims, 6 Drawing Sheets

CABLE REEL

BACKGROUND OF THE INVENTION

1. Field of the Invention

The present invention generally relates to a cable reel in which a flexible cable, such as a flat cable, is employed to provide electrical connection between a stationary member and a movable member, and more particularly, to a lock mechanism which allows the stationary member and the movable member to have their relative position properly determined and maintained before the cable reel is assembled onto the steering system of an automobile.

2. Description of Related Art

A cable reel for providing electrical connection between a stationary member and a movable member is used as a connector means for various electrical circuits, such as an air bag circuit, incorporated in the steering system of an automobile. In this application, it is necessary that the cable reel be assembled onto the steering system in such a manner that the movable member is able to rotate from the neutral position of the steering wheel by substantially the same extent in either direction. For this purpose, a certain type of cable reel has been used, which includes a position indicator mechanism for offering guidance to the operation of positioning the stationary and movable members.

Such a conventional positioning mechanism has, for example, the following arrangement. A rotary shaft, with a gear supported thereon, is provided on either the stationary member or the movable member, and an engagement portion, engageable with the gear on the rotary shaft, is provided in the other member. Each time the movable member makes one revolution, one of the teeth of the gear engages with the engagement portion, causing the gear to rotate by a predetermined angle. The neutral position of the movable member relative to the stationary member is established when the movable member is in a prescribed position relative to the stationary member with a particular tooth of the gear being located at a particular position. In order to indicate the neutral position, a mark is provided on a particular tooth of the gear, and on a particular position of the member confronting the gear. Prior to the assembly of the cable reel onto the steering system, the marks are aligned with each other so that the cable reel may be assembled in a state where the movable member is in its neutral position relative to the stationary member.

It is necessary that the movable member be maintained in its neutral position relative to the stationary member until the assembly comprising the movable and stationary members is assembled onto the steering system. A locking means for this purpose is disclosed in U.S. Pat. No. 4,735,573. Here, a locking means comprises a lock member having a clip pin, capable of a snapping action, and a locking projection. The clip pin is snap-fitted into a bore formed in the movable member, and the locking projection is fitted into a recess formed in the stationary member. After assembly onto the steering system has been completed, the lock member is removed.

The lock member is formed of a relatively hard material, such as a plastic, and adapted to be attached to and detached from the cable reel by snapping the clip pin, formed integrally with the lock member, into or out of the bore formed in the movable member. If the force with which the clip pin snaps is increased so as to prevent any inadvertent disengagement of the lock member during conveyance, etc., there is a risk that the removal of the lock member after the completion of the assembly onto the steering system may become difficult. If the lock member is forcibly removed, there is a risk that the clip pin may break into pieces, which pieces may stay in the steering system to generate noise when the automobile is running.

SUMMARY OF THE INVENTION

The present invention has been accomplished in view of the above-described circumstances. An object of the present invention is to provide a cable reel with which the movable member can be securely locked with respect to the stationary member, and can be released from its locked position with good operational efficiency.

In order to achieve the above object, according to the present invention, there is provided a cable reel comprising: a stationary member; a movable member mounted in such a manner as to be rotatable relative to the stationary member; and a flexible cable wound in a space between the stationary member and the movable member, the stationary member and the movable member allowing a lock to be applied thereon to prevent any free rotation of the stationary and movable members relative to each other, the lock including a lock member, a screw supported on the lock member in such a manner as to be screwable into one of the stationary and movable members, and a stopper integrally formed on the lock member for preventing disengagement of the screw.

When the cable reel is being manufactured, the position of the movable member relative to the stationary member is determined to be a predetermined zero position. The lock is applied to the movable and stationary members, which have thus been positioned, and the screw of the lock is screwed into one of the stationary and movable members. Thus, it is assured that, when the cable reel will be subjected to assembly onto equipment, such as a steering system, the movable member will always be in the zero position. When the cable reel is about to be assembled onto the equipment, the screw is unscrewed, and the lock is removed from the movable and stationary members. In this process, since the screw is maintained on the lock member of the lock by the stopper, the screw can be removed together with the lock member, thereby eliminating the risk of the screw remaining in the equipment.

DESCRIPTION OF THE PREFERRED EMBODIMENT

Figure 1:
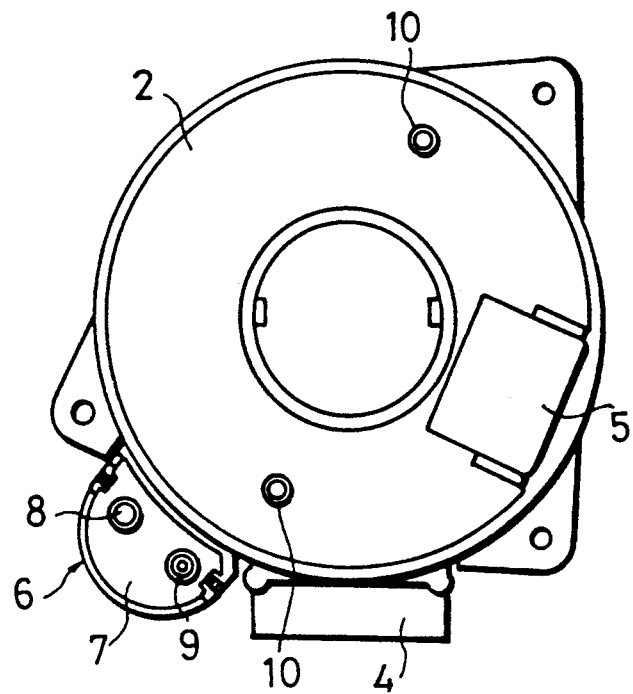
FIG. 1 is a plan view of an embodiment of the cable reel according to the present invention, showing the state of the cable reel before a lock for the cable reel is applied thereon.
Figure 2:
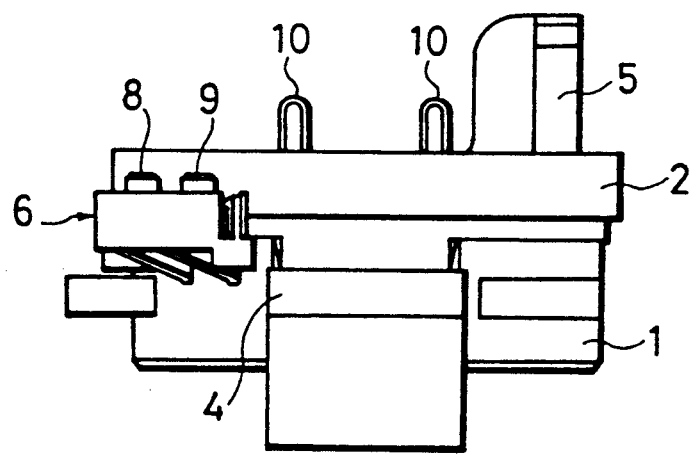
FIG. 2 is a front view of the cable reel, showing the same state of the cable reel as FIG. 1.
Figure 3:
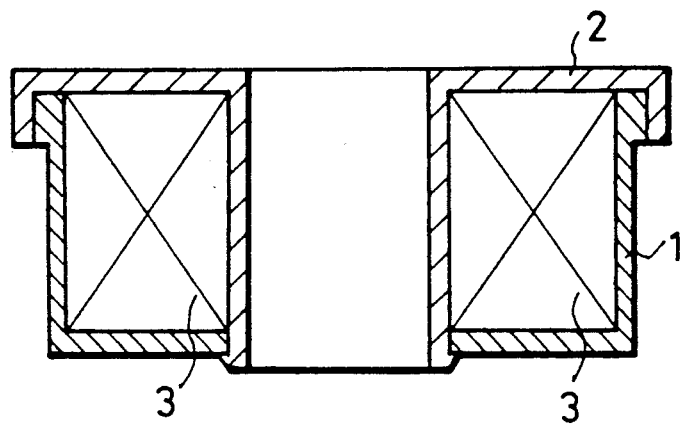
FIG. 3 is a sectional view of the cable reel.

An embodiment of the present invention will now be described with reference to the accompanying drawings. FIG. 1 to FIG. 3 illustrate, in a plan view, a front view and a sectional view, respectively, a cable reel according to an embodiment of the present invention, the cable reel being shown in its state before a lock (described later) is applied thereon. Referring to these figures, the cable reel includes a stationary member 1 opening into the upper end thereof, and a movable member 2 rotatably disposed in the center of the stationary member 1 in such a manner as to cover the opening of the stationary member 1. A flat cable 3, having a known structure, for instance, a structure in which a plurality of conductors are encased in a pair of base films, is wound in the form of a plurality of turns in the space defined between the stationary member 1 and the movable member 2. One end of the flat cable 3 is extended to the outside of the stationary member 1 through a connector 4, and the other end is extended to the outside of the movable member 2 through another connector 5. A positioning mechanism 6, having a gear (not shown) therein, is provided on a portion of the outer annular wall of the stationary member 1. On the other hand, engagement projections (not shown), capable of engaging with one of the teeth of the gear, and thus causing the gear to rotate by a predetermined angle, are provided on a portion of the outer peripheral edge of the movable member 2. The positioning mechanism 6 has a cover 7 provided thereon, the cover 7 having a positioning projection 8 and a screw receptacle 9, both in a cylindrical form projecting from the cover 7. The upper surface of the movable member 2 has a pair of link pins 10 projecting therefrom for the purpose of determining the position of the cable reel relative to the rotor of the steering system (not shown) of an automobile.

The cable reel, having the above-outlined construction, is used as an electrical connector means forming a part of an air bag system or the like while the movable member 2 is secured to the steering wheel (rotor) of the steering system, and the stationary member 1 is secured to the bearing (stator) of the steering shaft of the steering system. When the cable reel is assembled in this relationship on the steering system, the movable member 2 must be able to rotate in forward and backward direction by an equal amount from a neutral position. In order to meet this requirement, the manufacturing of the cable reel includes the following procedure: the stationary member 1, the stationary member 2 and the flat cable 3 are first assembled together in such a manner that the flat cable 3 is situated between these members 1 and 2; and, after the completion of this assembly, the positioning mechanism 6 is used to bring the movable member 2 and the stationary member 1 into their proper position relative to each other. In order to maintain the properly positioned state of the movable member 2 and the stationary member 1, a lock is used.

Figure 4:
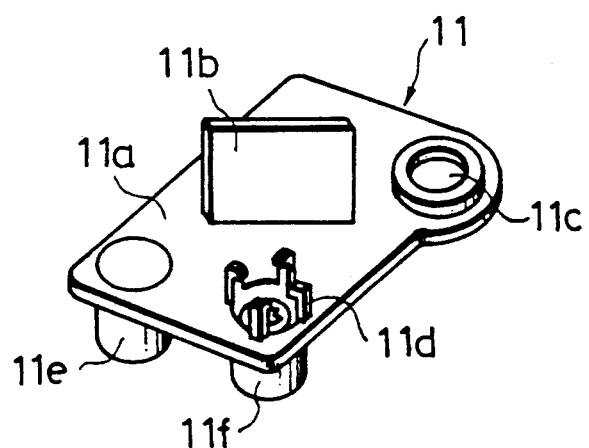
FIG. 4 is a perspective view of the lock.
Figure 5:
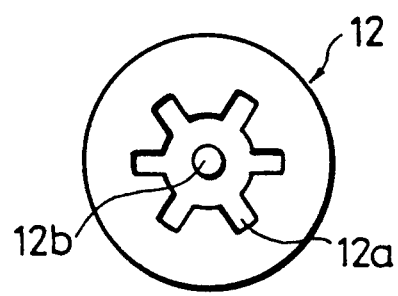
FIG. 5 is a plan view of a screw of the lock.
Figure 6:
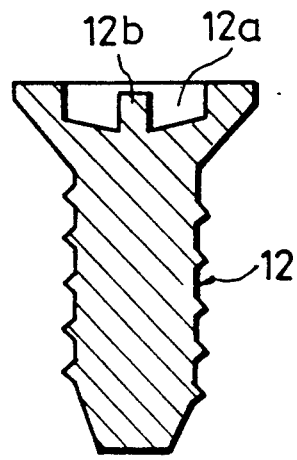
FIG. 6 is a sectional view of the screw.
Figure 7:
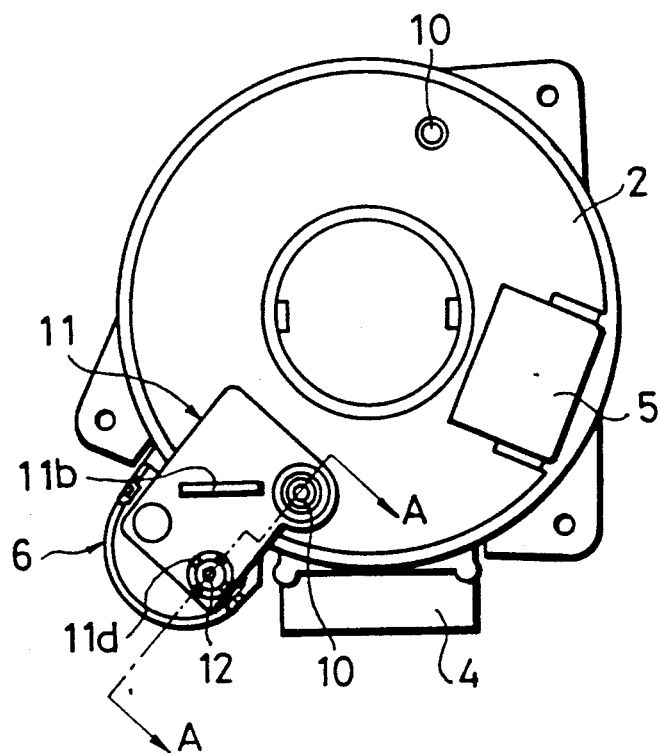
FIG. 7 is a plan view of the cable reel, showing the state of the cable reel where the lock is applied thereon.
Figure 8:
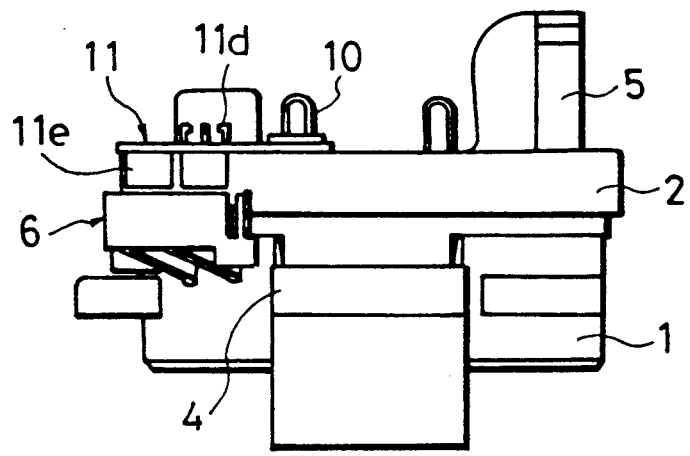
FIG. 8 is a front view of the cable reel, showing the same state of the cable reel as FIG. 7.

FIG. 4 shows the lock in a perspective view, and FIGS. 5 and 6 show a screw of the lock in a plan view and a sectional view, respectively. FIGS. 7 and 8 illustrate, in a plan view and a front view, respectively, the cable reel in its state where the lock is applied thereon, this state of the cable reel being shown in a sectional view in FIG. 9. Referring to FIG. 4 to FIG. 6, the lock includes a lock member 11 and a screw 12. The lock member 11 is formed of a synthetic resin, and has a flat plate portion 11a, a projection 11b projecting from a substantially central location on the upper surface of the flat plate portion 11a, an engagement through-hole 11c formed in a portion at one corner of the flat plate portion 11a, a stopper 11d consisting of four stopper sections and projecting from a location at another corner on the upper surface of the flat plate portion 11a, a first engagement hollow-cylindrical portion 11e perpendicularly projecting from a certain position on the lower surface of the flat plate portion 11a, and a second engagement hollow-cylindrical portion 11f perpendicularly projecting from a certain position on the lower surface of the flat plate portion 11a which coincides with the stopper 11d. The screw 12 is supported on the lock member 11 with the shank of the screw 12 extending from the same side of the flat plate portion 11a as the stopper 11d through a bore into the second engagement hollow-cylindrical portion 11f. The head of the screw 12 is able to abut on the distal ends of the stopper sections of the stopper 11d, whereby the screw 12 is prevented from disengaging from the lock member 11. As shown in FIGS. 5 and 6, the head of the screw 12 has an adjustment groove 12a with, for example, a hexagonal shape, and a protrusion 12b in the middle of the groove 12a. The screw 12 can be driven by means of only a certain type of screwdriver (not shown) whose end is in conformity with the above configuration of the head of the screw 12. Thus, the screw 12 cannot be operated by means of a common screwdriver, such as a screwdriver for screws whose head is slotted or recessed in the shape of "—" or "+".

Figure 9:
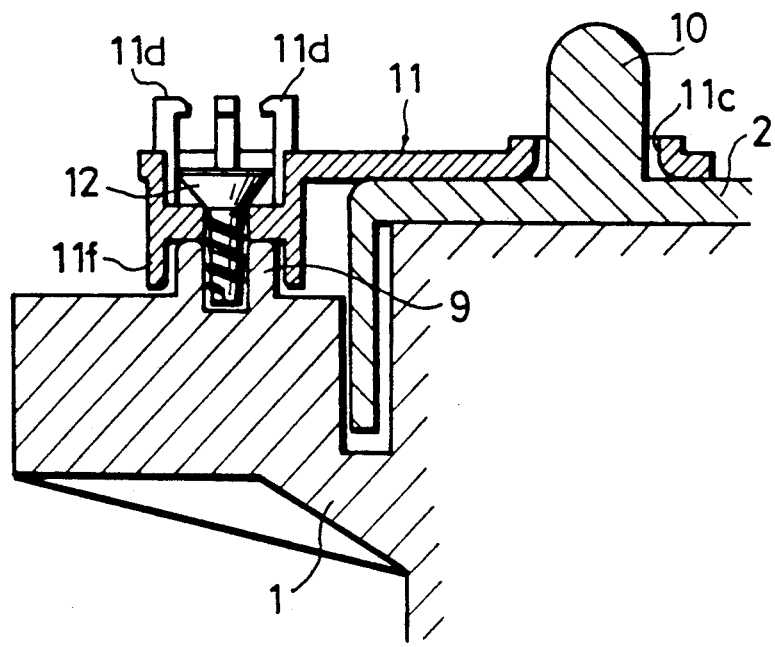
FIG. 9 is a sectional view taken along the line A—A shown in FIG. 7.
Figure 10:
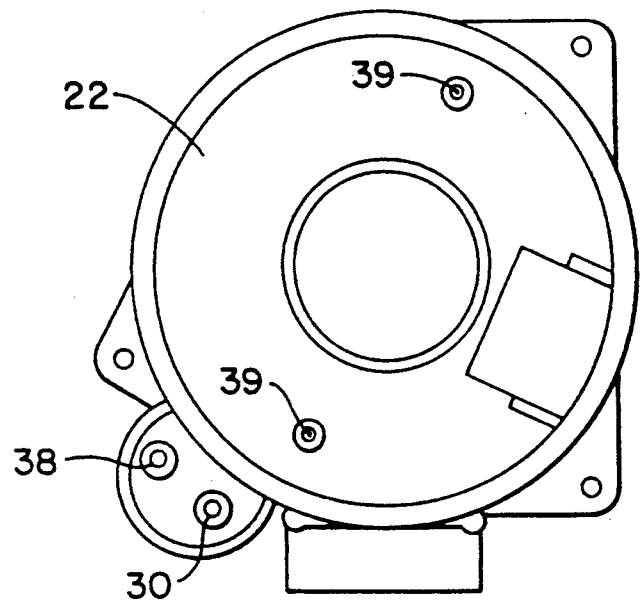
FIG. 10 is a plan view of an alternate embodiment of the cable reel according to the present invention, showing the state of the cable reel before a lock for the cable reel is applied thereon.
Figure 11:
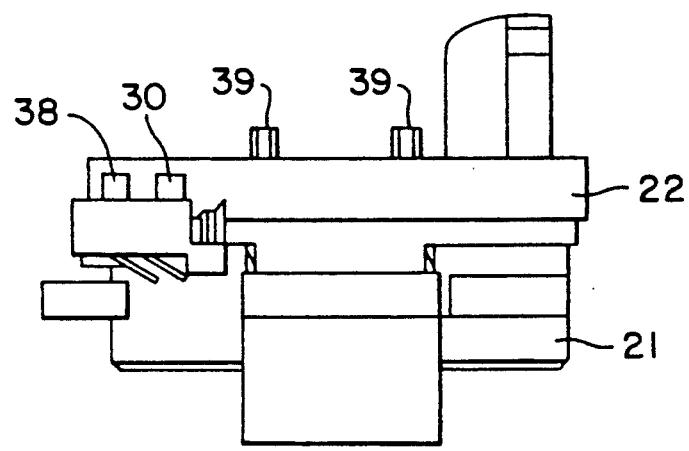
FIG. 11 is a front view of the cable reel, showing the same state of the cable reel as FIG. 10.
Figure 12:
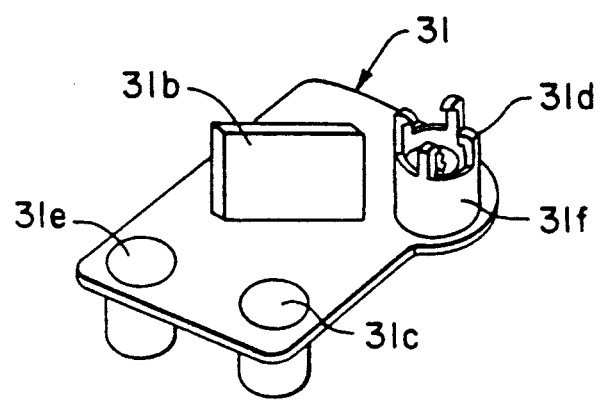
FIG. 12 is a perspective view of an alternate embodiment of the lock.
Figure 13:
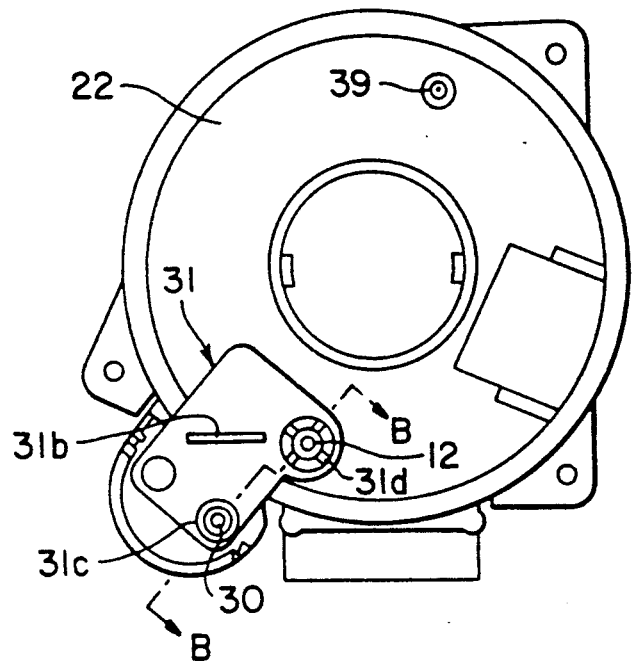
FIG. 13 is a plan view of the cable reel of FIG. 10, showing the state of the cable reel where the lock is applied thereon.
Figure 14:
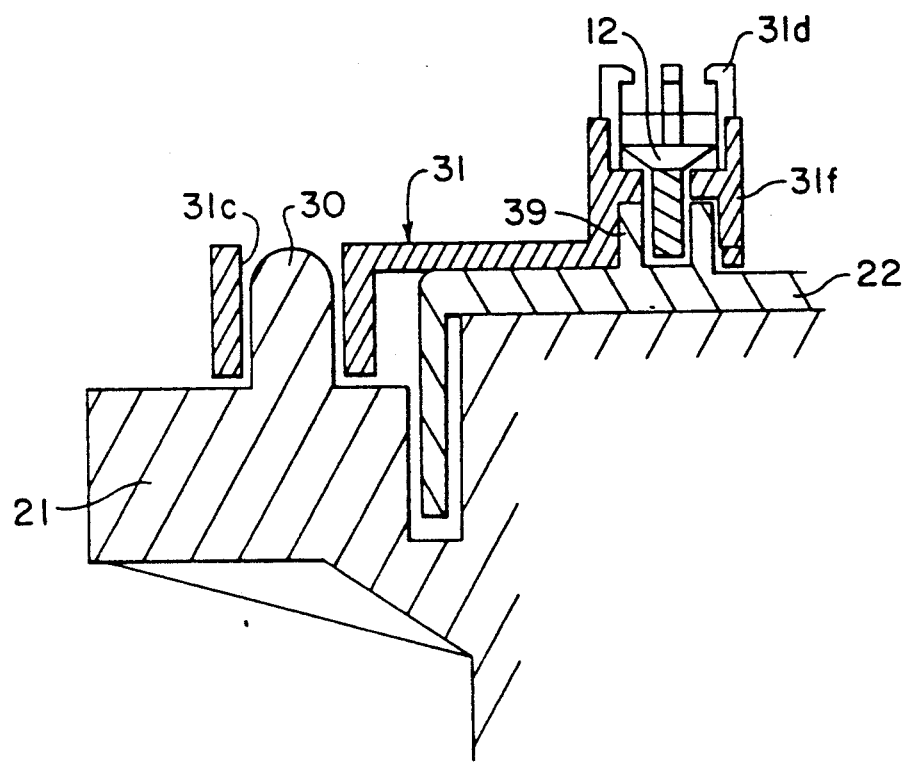
FIG. 14 is a sectional view taken along the line B—B shown in FIG. 13.

The lock having the above construction is applied to the cable reel when the relative position of the movable member 2 and the stationary member 1 has been determined to be the proper position, as described above, so that the movable member 2 and the stationary member 1 are maintained in their properly positioned state. Specifically, as shown in FIGS. 7 to 9, the first and second engagement hollow-cylindrical portions 11e and 11f, both of the lock member 11, are respectively fitted onto the positioning projection 8 and the screw receptacle 9, both of the stationary member 1, while allowing one of the link pins 10 to pass through the engagement through-hole 11c of the lock member 11. Thereafter, the end of a special screwdriver of the above-described type is introduced through a gap between stopper sections, and the screw 12 is screwed into the screw receptacle 9. In this state, the lock prevents any rotation of the movable member 2 relative to the stationary member 1. Accordingly, during the conveyance, etc. of the cable reel, the movable body 2 undergoes no free rotation with respect to the stationary member 1, thereby assuring that the properly positioned state of the movable and stationary members 2 and 1 is maintained until immediately before the assembly of the cable reel onto the steering system.

When the cable reel is about to be assembled onto the steering system, the screw 12 is first unscrewed by means of the special screwdriver. Then, the lock is removed from the cable reel by holding the projection 11b by finger, pincers or the like. The assembly of the cable reel onto the steering system takes place after the movable member 2 is thus released from the state of being locked by the lock. In the removal process, since the screw 12 is prevented from disengaging from the lock member 11 by the stopper 11d, the screw 12 can be removed together with the lock member 11 when the lock is being removed. Thus, the risk of the screw 12 remaining in the steering system is eliminated.

As described above, with the above-described embodiment of the present invention, the lock prevents any free rotation of the movable member 2 relative to the stationary member 1, thereby making it possible to assemble the cable reel onto the steering system in the state where the movable member 2 is locked in a predetermined zero position. When the movable member 2 is to be released from the locked state, the screw 12 is removed from the cable reel together with the lock member 11, thereby eliminating troubles which can be caused by the screw 12 erroneously remaining in the steering system, such as the generation of noise when the automobile runs, or the short-circuit resulting from the screw 12 contacting a part of the electrical circuit. The stopper 11d having four stopper sections prevents the screw 12 from disengaging from the lock member 11. These stopper sections have flexibility, which can be utilized, when causing the screw 12 to be supported on the lock member 11, to flex the stopper sections outward with the screw 12. This is advantageous in that a member, such as a washer, for the prevention of disengagement is made unnecessary, thereby enabling a reduction in cost. Further, the configuration of the screw 12 is such that it cannot be operated by a common screwdriver, such as a "—" type or "+" type screwdriver. This prevents the risk of a locking state of the lock being released by a mischievous action or the like.

In the foregoing embodiment, the movable member 2 is brought into a preliminary-locked state by fitting the first and second engagement hollow-cylindrical portions 11e and 11f onto the positioning projection 8 and the screw receptacle 9, respectively, while passing one of the link pins 10 through the engagement through-hole 11c. However, the configuration of the engagement hollow-cylindrical portions 11e and 11f, the configuration of the engagement through-hole 11c, and the particular parts of the stationary and movable members 1 and 2 with which the above parts of the lock member 11 are brought into engagement, may be other than those in the foregoing embodiment so long as the lock member 11 is engageable with each of the stationary and movable members 1 and 2, and the screw 12 screwable into a receptacle formed on one of the stationary and movable members 1 and 2 is disengageably supported on the lock member 11. An example of such an alternative embodiment is shown in FIGS. 10-14. These figures show the following elements: stationary member 21, movable member 22, projection 30, receptacle 39, lock member 31, stopper 31d, projection 31b, first opening 31f, second opening 31c, third opening 31e and second projection 38.

As has been described above, according to the present invention, a lock member and a screw enable the movable member to be securely locked with respect to the stationary member. Furthermore, the screw can be handled together with the lock member when releasing the movable member from its locked state, thereby making it possible to eliminate the risk of the screw erroneously remaining in the steering system, and also to improve operational efficiency.

What is claimed is:

1. A cable reel for providing electrical connection between a stationary member and a movable member in the steering system of an automobile, comprising:
   a stationary member including a receptacle;
   a movable member rotatably connected to said stationary member, said movable member including a projection;
   a flexible cable wound in a space between said stationary member and said movable member,
   a separate lock member to prevent any free rotation of said stationary and movable members relative to each other, said lock member including a first opening disposed adjacent to said receptacle, and a second opening into which is disposed said projection; and
   a fastener disposed through said first opening and into said receptacle, thereby connecting said lock member to said stationary member.

2. A cable reel of claim 1 wherein said stationary member further comprises a second projection and said lock member further comprises a third opening into which is disposed said second projection.

3. A cable reel of claim 1 wherein said fastener is a screw.

4. A cable reel of claim 1 wherein said lock member further comprises a stopper for preventing disengagement of said fastener from said lock member.

5. A cable reel for providing electrical connection between a stationary member and a movable member in the steering system of an automobile, comprising:
   a stationary member including a projection;
   a movable member rotatably connected to said stationary member, said movable member including a receptacle;
   a flexible cable wound in a space between said stationary member and said movable member,
   a separate lock member to prevent any free rotation of said stationary and movable members relative to each other, said lock member including a first opening disposed adjacent to said receptacle, and a second opening into which is disposed said projection; and
   a fastener disposed through said first opening and into said receptacle, thereby connecting said lock member to said movable member.

6. A cable reel of claim 5 wherein said stationary member further comprises a second projection and said lock member further comprises a third opening into which is disposed said second projection.

7. A cable reel of claim 5 wherein said fastener is a screw.

8. A cable reel of claim 5 wherein said lock member further comprises a stopper for preventing disengagement of said fastener from said lock member.

* * * * *